Nov. 25, 1958   J. R. WALD, JR., ET AL   2,861,643
TIRE ENGAGED FRICTION DRIVE FOR VEHICLE TRACTION WHEEL
Filed April 5, 1954   2 Sheets-Sheet 1
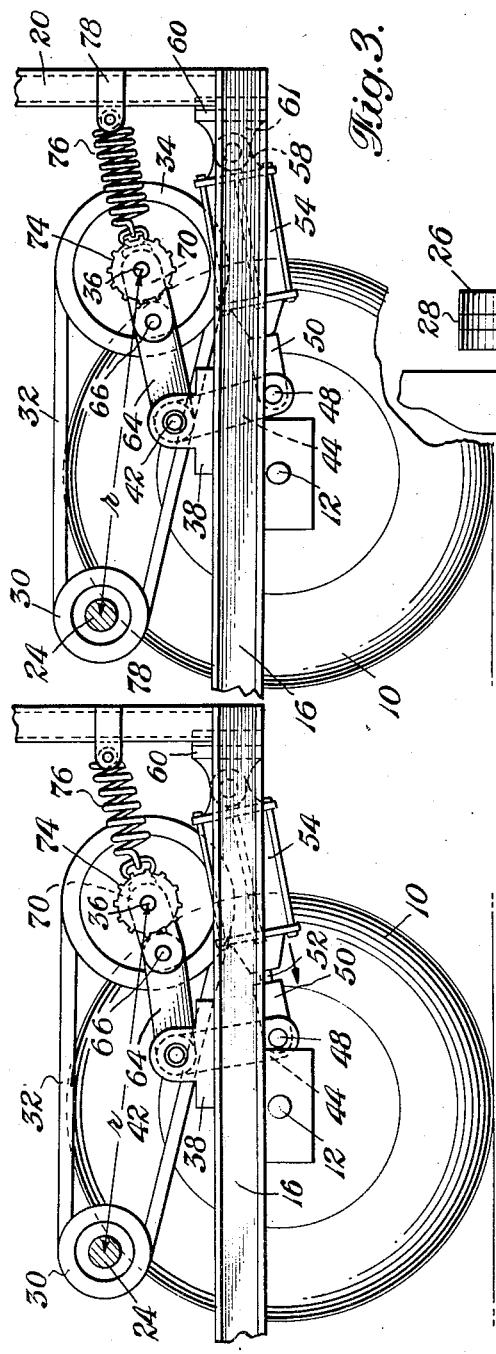
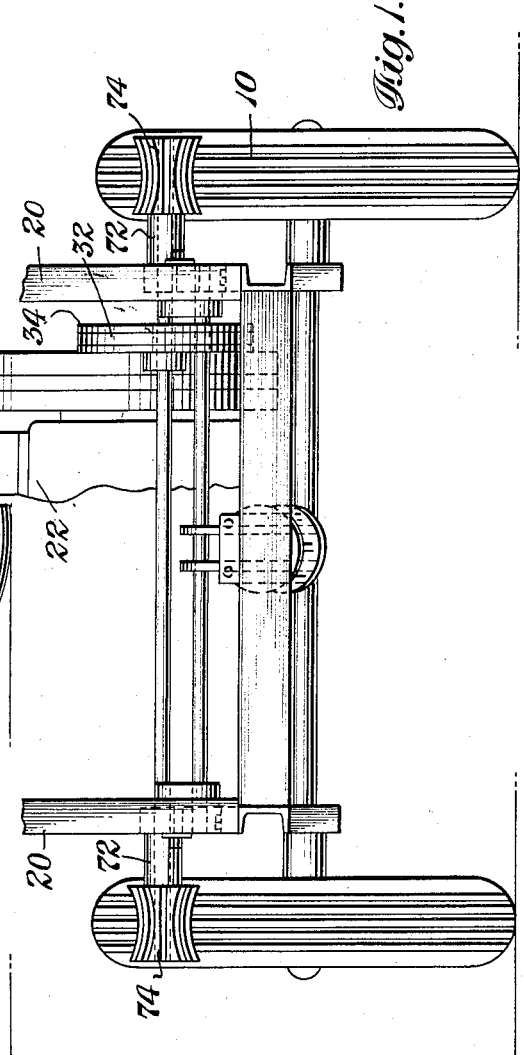
INVENTORS
John R. Wald, Jr.
Rufus W. Wilson
and Carl L. Fry.
BY Karl W. Flocks
ATTORNEY

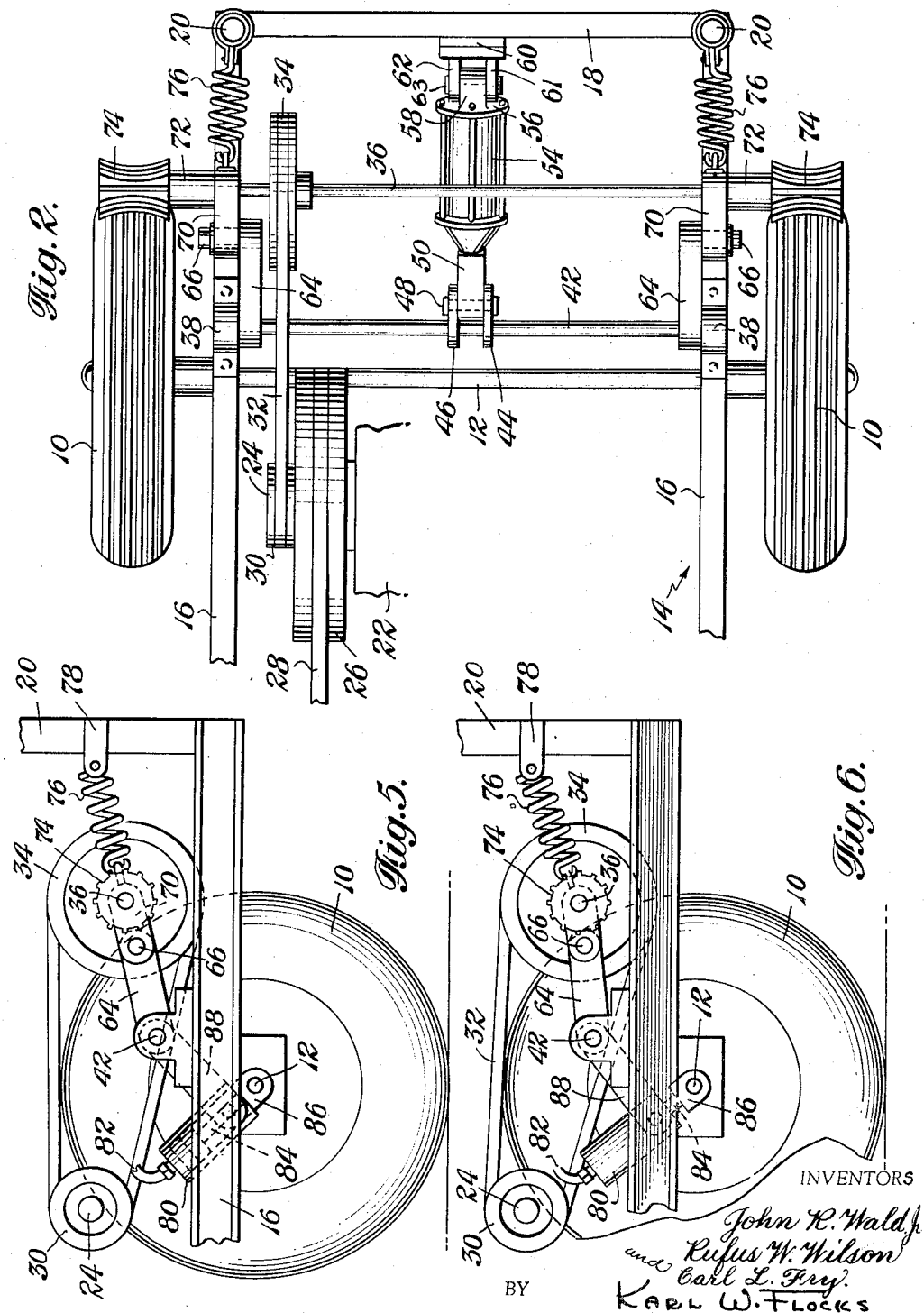

United States Patent Office

2,861,643
Patented Nov. 25, 1958

2,861,643

TIRE ENGAGED FRICTION DRIVE FOR VEHICLE TRACTION WHEEL

John R. Wald, Jr., Montoursville, Rufus W. Wilson, Huntingdon, and Carl La Rue Fry, Cogan Station, Pa., assignors to Wald Industries, Inc., Huntingdon, Pa., a corporation of Pennsylvania Application April 5, 1954, Serial No. 420,964

3 Claims. (Cl. 180—74)

The present invention relates to a drive for a traction wheel. More particularly, the present invention relates to a drive for a traction wheel of a self-propelled device, the drive including a friction wheel operatively controlled by a pneumatically operated device and being adapted to engage said traction wheel for causing rotation thereof.

Self-propelled devices to which the present invention may be applied include by way of example lawn mowers, farm equipment and machines for marking lines on highways, streets and the like.

Self-propelled devices generally have mounted thereon a prime mover which is adapted to supply the necessary power for the operating mechanism of the device. The prime mover not only drives the operating mechanism of the device, but, in addition, is operatively connected to the traction wheels thereof and is thereby adapted to provide the necessary power for propelling the device during the operation thereof.

Prior to the instant invention, the heretofore known self-propelled devices, which included a friction wheel for driving the traction wheel, incorporated a pulley system whereby the shaft on which the friction wheel was mounted was constantly driven by a belt which in turn was secured to a pulley driven by the prime mover.

One of the problems encountered by these heretofore known traction wheel driving systems was in maintaining the drive belt in tight engagement with the drive pulley mounted on the drive shaft. Various techniques have been attempted in the heretofore known driving systems for maintaining the drive belt in tight engagement with the drive pulley. However, these systems were not very efficient inasmuch as it was found that in order to successfully maintain the required tension of the drive belt the frictional engagement between the friction wheel and the traction wheel was considerably lessened, thereby decreasing the efficiency of the drive. Moreover, the heretofore known friction drives were not immediately responsive to the operator's demands and were also difficult to engage with and disengage from the traction wheel.

It is therefore an object of the present invention to provide a drive for a traction wheel that is both efficient and simple to operate.

Another object of the present invention is to provide a friction drive for a traction wheel wherein the friction driving means is controlled by a pneumatically operated device to effectively maintain the friction wheel in tight engagement with the traction wheel.

Still another object of the present invention is to provide a belt driven friction drive for a traction wheel wherein the belt engaging the driving means for the friction drive is constantly maintained at the proper tension.

Still another object of the present invention is to provide a friction drive wheel for a traction wheel in which the friction drive wheel is mounted on a shaft that moves around the axis of a belt driving means to constantly maintain the friction drive wheel in proper engagement with the traction wheel.

Other objects and the nature and advantages of the instant invention will be apparent from the following description taken in conjunction with the accompanying drawings, wherein:

Fig. 1 is a rear elevational view of one embodiment of the present invention illustrating the friction drive as it is applied to the traction wheels of a self-propelled device;

Fig. 2 is a plan view of the invention illustrated in Fig. 1 showing the friction drive for the traction wheel of the self-propelled device;

Fig. 3 is a side elevational view of the invention illustrated in Figs. 1 and 2 showing the mechanism for controlling the friction drive disposed in the inoperative or non-driving position;

Fig. 4 is a view similar to Fig. 3 illustrating the friction drive control mechanism in the operative or driving position;

Fig. 5 is an end elevational view of a modification of the present invention with the friction drive control elements shown therein in the inoperative or non-driving position; and Fig. 6 is a view similar to Fig. 5 illustrating the friction drive control elements in the operative or driving position.

Referring now to the drawings, and particularly to Figs. 1–4, the invention embodied herein is illustrated and includes a pair of traction wheels 10 which form the rear wheels of a self-propelled device. The traction wheels 10 are rotatably mounted on an axle 12 which is journalled in a frame generally indicated at 14. The frame 14 includes side members 16, an end member 18 joined to the side members 16, and vertical rear posts 20 which are joined to the side members at the rear ends thereof. It is understood that the frame 14 in which the axle 12 is journalled may be adapted to have mounted thereon any known type of device that is utilized for a particular operation and requires self-propulsion such as, for example, farm equipment, a lawn mower, or a machine for marking lines on highways, streets or the like.

Suitably mounted on the frame 14 is a driven member 22 which, for example, may be a compressor or the like. The driven member 22 has journalled for rotation therewith a shaft 24 which has secured thereto a flywheel or pulley 26. The pulley 26 is driven by a belt 28 which is connected to a pulley (not shown) secured to a suitable prime mover such as a gasoline engine, the gasoline engine also being mounted on the frame 14 of the self-propelled device. Mounted on the shaft 24 adjacent the pulley 26 and adapted to rotate therewith is a reduction or propelling pulley 30. Engaging the propelling pulley 30 is a belt 32 which drivingly engages a drive pulley 34. The drive pulley 34 is secured for rotation on a drive shaft 36 and is of larger diameter than the propelling pulley 30, the speed thereof thereby being considerably less than that of the reduction pulley 30. It is apparent therefore that the drive shaft 36 rotates at a relatively slow speed and will drive the self-propelled device accordingly, as will hereinafter be described.

Mounted on the frame 14 in bearing members 38, which are secured to the side frame members 16, is a rockshaft 42. The rockshaft 42 is positioned in parallel relation with respect to the drive shaft 36 and has secured thereto approximately at the center thereof a pair of spaced links 44 and 46. Disposed between the. spaced links 44, 46 and secured thereto by a bolt 48 is a link member 50. The link member 50 is integrally joined to a piston rod 52 (Fig. 4), the piston rod 52 being joined to a piston (not shown) that is disposed in an air operated cylinder 54. As shown in Fig. 2, an end plate 56 of the air operated cylinder is formed with a projecting lug 58, the lug 58 being provided with an opening therein. Secured to the end member 18 of the frame 14 is a forked block 60 formed with arms 61 and 62, the arms 61, 62 receiving therebetween the lug 58 and being secured to the lug by a pin 63. The block 60 is securely mounted on the end member 18, thereby mounting the air cylinder between the block 60 and the rockshaft 42. The air cylinder 54 is provided with a suitable air inlet (not shown) which is connected to a source of air pressure such as an air compressor and may be controlled by any suitable manually operated valve located near the operator of the self-propelled device.

Secured to the rockshaft 42 adjacent the bearings 38 are link blocks 64. Pivotally secured to the link blocks 64 at pivot points 66 are elbow blocks 70. The elbow blocks 70 include extensions 72 provided with openings which are adapted to receive the drive shaft 36 in bearing engagement therein. Mounted on the drive shaft 36 for rotation therewith at the extreme ends thereof are friction drive wheels 74 which are adapted to engage the traction wheels 10. In order to normally maintain the friction drive wheels 74 out of engagement with the traction wheels 10, spring members 76 are provided and are connected to the elbow blocks 70 and to links 78 (Figs. 3 and 4) which are secured to the rear posts 20. Referring to Figs. 3 and 4, it is apparent that the drive shaft 36, which carries the friction drive wheels 74, is suspended by means of the spring members 76 and, in the inoperative or non-driving position (Fig. 3) is normally located such that the friction drive wheels 74 are just out of engagement with the traction wheels 10.

In operation, the prime mover mounted on the frame 14 of the self-propelled device is started and drives the pulley 26 through the belt 28. Since the pulleys 30 and 26 are both secured to the shaft 24, the pulley 30 will also be rotated and at the same speed as pulley 26. The propelling pulley 30 drives the larger drive pulley 34 through the drive belt 32 and the drive shaft 36 is accordingly driven at a correspondingly slower speed. Normally, the diameter of the pulley 26 is considerably larger than the prime mover pulley to which it is drivingly connected; thus, the speed reduction from the prime mover to the drive shaft 36 is such that the drive shaft 36 is driven at a sufficiently low enough speed to provide for operation of the operating mechanism mounted on the self-propelled device.

Referring to Fig. 3, the driving mechanism is shown in the inoperative or non-driving position, the friction driving wheels 74 being suspended out of engagement with the traction wheels 10 by the spring members 76. When it is desired to propel the device, air is admitted to the air cylinder 54, causing the piston disposed therein to be moved outwardly, thereby moving the piston rod 52 attached thereto in the direction of the arrow, as shown in Fig. 4. Movement of the piston rod 52 outwardly forces the links 44 to rotate the rockshaft 42, thereby moving the linkage blocks 64 slightly downwardly. The elbow links 70 are thus pivoted around the pivot points 66 and pull the shaft 36 toward the traction wheels 10 and against the action of the springs 76. The friction drive wheels 74 are thus brought into engagement with the traction wheels 10 and thereby cause rotation thereof to propel the device forwardly. Since the drive shaft 36 is moved with respect to the rockshaft 42 when the drive mechanism is actuated, means must be provided for maintaining the driving belt 32 in tight engagement with the drive shaft, otherwise slippage will occur and the drive to the traction wheels 10 will fail. In order to maintain the tension on the drive belt 32 when the drive mechanism is actuated, the drive shaft is moved on an arc about a fixed point, thereby maintaining the same relative distance with respect to the fixed point. In carrying out this theory, the shaft 24, upon which the propelling pulley 30 is mounted, is fixed in position. The drive shaft 36 is connected to the shaft 24 by the drive belt 32, the distance between the axis of the drive shaft 36 and shaft 24 defining a radius $r$ (Figs. 3 and 4). When the drive shaft 36 is moved toward the traction wheels 10, it pivots about the axis of the shaft 24 and describes an arc, the radius $r$ being maintained constant. The belt 32 is thus tightly engaged with the drive pulley 34 at all times and the friction drive wheels 74 contact the traction wheels without any resulting slippage in the drive belt.

Referring now to Figs. 5 and 6, a modification of the present invention is illustrated and includes primarily the same elements described hereinabove in connection with Figs. 1 and 4. In the modified form of the invention, an air cylinder 80 is provided and has secured thereto an inlet air conduit 82 connected to a suitable source of compressed air. Disposed within the air cylinder 80 is a piston (not shown) which is connected to a piston rod 84 shown in Fig. 6, the piston rod 84 being connected to a block 86 which is in turn secured to the axle 12. A pair of links, one of which is shown at 88, are connected at one end thereof to the air cylinder 80 and at the other end thereof to the center of the countershaft 42. Also secured to the rockshaft 42 adjacent the end thereof, as described hereinabove, are link blocks which are pivotally connected to elbow blocks 70. As described above, the elbow blocks 70 receive the drive shaft 36 for rotation therein and the drive shaft 36 has secured thereto at the ends thereof the friction drive wheels 74. The drive shaft 36 is driven by the pulley 34 which is operatively connected to the propelling pulley 30, while the propelling pulley 30 is connected to the shaft 24 which, in turn, is driven by a suitable power source.

In operation, when it is desired to move the friction drive wheel 74 into engagement with the traction wheel 10, air is supplied through the air conduit 82 to the air operated cylinder 80. The cylinder 80 in this instance is moved with respect to the piston rod 84 in the direction of the arrow (Fig. 6), thereby pivotally moving the link 88 and rotating the rockshaft 42. Rotation of the rockshaft 42 causes the link block 64 to pivotally rotate the elbow block 70, thereby moving the friction drive wheel 74 into engagement with the traction wheel 10. As described above, as the friction drive wheel 74 is moved into engagement with the traction wheel 10, the drive shaft 36 is moved on an arc around the axis of the shaft 24 upon which the propelling pulley is mounted. The belt 32 connecting the propelling pulley 30 and drive pulley 34 is thereby maintained under constant tension and the drive from the propelling pulley 30 to the friction drive wheel 74 is accordingly properly maintained.

It is apparent that the present invention provides an efficient and simple to operate device that can be quickly moved into position to drive the traction wheels of a self-propelled device. The friction drive wheels are maintained in firm contact with the traction wheels under all operating conditions and the drive to the friction drive wheels through the drive shaft is assured since the proper tension is maintained at all times on the drive belt 32. Whether the piston in the air operated cylinder is actuated as in Figs. 1–4, or the cylinder itself is moved as in Figs. 5 and 6, the linkage mechanism positively moves the drive shaft 36 toward the traction wheels and against the action of the tension springs 76. When the air in the air cylinder in either case is released, the tension springs tend to pull the shaft 36 and friction drive wheels away from the traction wheels, thus disconnecting the drive and halting movement of the self-propelled device. The operator of the device may be provided with a control for operating the air cylinder, thereby providing for instantaneous and positive control of the driving mechanism.

It will be obvious to those skilled in the art that various changes may be made without departing from the spirit of the invention and therefore the invention is not limited to what is shown in the drawings and described in

What is claimed is:

1. In a self-propelled device, a frame, a traction wheel mounted on said frame, a drive shaft rotatably mounted on said frame, a friction wheel fixed to said drive shaft for rotation therewith, means mounted on said frame for driving said drive shaft, the axis of said driving means being spaced from and parallel with said drive shaft, said drive shaft being adapted to pivot about the axis of said drive means, control means for moving said friction wheel in engagement with said traction wheel, said control means including a rockshaft positioned in parallel relation with respect to said drive shaft, a first link secured to said rockshaft, a second link secured to said first link and to said drive shaft, means for normally maintaining said friction wheel out of engagement with said traction wheel, and means for rotating said rockshaft to cause said links to pivot with respect to each other, said drive shaft thereby pivoting about the axis of said driving means to cause said friction wheel to contact said traction wheel.

2. In a self-propelled device, a frame, a traction wheel mounted on said frame, a drive shaft mounted for rotation on said frame and having a friction wheel secured for rotation therewith, drive means mounted on said frame, and drivingly engaging said drive shaft for causing rotation thereof, the axis of said drive means being spaced from and parallel with said drive shaft, said drive shaft being adapted to pivot about the axis of said drive means to position said friction wheel in engagement with said traction wheel, and means for controlling pivotal movement of said drive shaft, said controlling means including a rockshaft, a pair of links pivotally connected to each other and interconnected between said drive shaft and said rockshaft, means operatively connected to said links for normally maintaining said friction wheel out of engagement with said traction wheel, and means for rotating said rockshaft, said links pivoting in response to rotation of said rockshaft to pivotally move said drive shaft in the direction of said traction wheel, thereby causing said friction wheel to drivingly engage said traction wheel.

3. In a drive for a traction wheel, a frame, a rockshaft journalled for rotation on said frame, a drive shaft positioned in parallel relation to said rockshaft, linkage means interconnecting said drive shaft to said rockshaft, means operatively associated with said frame for rotating said drive shaft, the axis of said rotating means being spaced from and parallel with said drive shaft, friction drive means secured to said drive shaft and adapted to engage said traction wheel for causing rotation thereof, means operatively connected to said linkage means for normally maintaining said friction drive means out of engagement with said traction wheel, said linkage means comprising a link block secured to said rockshaft, and an elbow block pivotally secured to said link block and receiving said drive shaft for rotation therein, said elbow block pivotally moving in response to rotation of said rockshaft to move said drive shaft toward said traction wheel, and control means operatively secured to said rockshaft for rotating said rockshaft, thereby actuating said linkage means for moving said drive shaft about the axis of said rotating means, whereby said friction drive means is positioned in driving engagement with said traction wheel, the movement of said drive shaft about the axis of said rotating means properly maintaining said rotating means in driving relation with said drive shaft, said control means comprising an air cylinder having a piston rod slidably disposed therein and operatively connected to said rockshaft, said piston rod being movable to rotate said rockshaft when said traction wheel is to be driven.

References Cited in the file of this patent

UNITED STATES PATENTS

| | | |
|---|---|---|
| 2,328,233 | Schunk | Aug. 31, 1943 |
| 2,523,439 | May | Sept. 26, 1950 |
| 2,544,831 | Guyton | Mar. 13, 1951 |
| 2,578,886 | Isherwood et al. | Dec. 18, 1951 |
| 2,623,603 | Cutlan et al. | Dec. 30, 1952 |
| 2,691,421 | Swanson | Oct. 12, 1954 |

FOREIGN PATENTS

| | | |
|---|---|---|
| 5,009 | Great Britain | Mar. 5, 1896 |
| 88,984 | Switzerland | Apr. 16, 1921 |